United States Patent
Schierz et al.

(12)

(10) Patent No.: US 6,737,146 B2
(45) Date of Patent: May 18, 2004

(54) BEDDING MAT FOR SUPPORTING AN EXHAUST GAS CATALYST

(75) Inventors: Claus Schierz, Freiberg (DE); Bernhard Kohlsdorf, Niederschöna (DE)

(73) Assignee: ASGLAWO GmbH Stoffe zum Dämmen und Verstärken, Hilbersdorf (DE)

( * ) Notice: Subject to any disclaimer, the term of this patent is extended or adjusted under 35 U.S.C. 154(b) by 77 days.

(21) Appl. No.: 09/796,879

(22) Filed: Mar. 1, 2001

(65) Prior Publication Data
US 2002/0058451 A1 May 16, 2002

(30) Foreign Application Priority Data
Nov. 16, 2000 (DE) .......................... 100 57 158

(51) Int. Cl.⁷ ................................. B32B 1/04
(52) U.S. Cl. .................. 428/74; 428/192; 428/193; 428/220; 428/221
(58) Field of Search ................................ 428/192, 193, 428/74, 220, 221

(56) References Cited

U.S. PATENT DOCUMENTS

RE34,020 E  *  8/1992  Briggs et al. ................ 428/198
5,332,609 A  *  7/1994  Corn .......................... 422/179

FOREIGN PATENT DOCUMENTS

JP        59-000519   *  6/1982

* cited by examiner

Primary Examiner—Elizabeth M. Cole
(74) Attorney, Agent, or Firm—Collard & Roe, P.C.

(57) ABSTRACT

A bedding mat for supporting an exhaust gas catalyst in a metallic catalyst housing used to purify motor vehicle exhaust gases comprises a yarn processed to form a flat textile structure. The yarn comprises a plurality of voluminous, thermally stable filaments which are aligned parallel with each other in a bundle and a casing around the bundle which decomposes upon heating. An edge protection made of thermally stable threads is provided along the edges of the flat structure.

15 Claims, No Drawings

BEDDING MAT FOR SUPPORTING AN EXHAUST GAS CATALYST

BACKGROUND OF THE INVENTION

1. Field of the Invention

The invention relates to a bedding mat for supporting an exhaust gas catalyst in a metallic catalyst housing. This catalyst is used for purifying the exhaust gases of motor vehicles. The bedding mat is arranged along the periphery of the ceramic body supporting an exhaust gas catalyst, and seals the annular gap between the ceramic carrier body and the catalyst housing, which consists of a metallic material. This bedding mat is expected to permit a safe and shock-free bedding of the ceramic carrier body. It also has to compensate for any change in the width of the annular gap to be sealed when the metallic housing of the catalyst expands due to the operating temperature, which is determined by the combustion gases. Furthermore, the bedding mat forms a heat insulation layer on the inner wall of the catalyst housing, and reduces the sound noise of the flowing exhaust gases, which are transmitted to the outside.

2. The Prior Art

A mechanically solidified bedding mat made of textured yarns is known from Patent WO 00/36284. The yarns are fixed in the flat structure under tensile stress by quilted seams. The quilted seams are produced with a sewing thread whose thermal stability is lower than the operating temperature of the bedding mat. The quilted seams are destroyed when the bedding mat is heated. Deformation energy on the textured yarn is thereby released, and the volume of the bedding mat increases. The expansion property of the bedding mat results from laying the textured yarns under tensile stress as they are being processed further to produce a mat. This tensile stress is mechanically fixed, and the possibilities available for manufacturing and conditioning these mats using this technique are restricted.

A bedding mat known from German Patent DE-U 93 11 571 consists of short inorganic fibers, an organic binding agent, as well as particle-shaped inclusions made of an expanding material such as, for example mica or vermiculite, which expands when acted upon by heat, and causes the volume of the bedding mat to increase at the operating temperature. The inorganic fibers included in the binding agent consist of ceramic staple fibers or crushed $SiO_2$-filaments, with an average length of a few millimeters. A bedding mat with short inorganic fibers exhibits a tendency to erosion and wear. Both the fibers and the particulate expanding material are discharged with the flowing combustion gases, with the result that the seal of the annular gap deteriorates, and erosion increases. The use of a fiber material with longer filaments increases the risk that fibers are blown out, although to a lesser degree. However, the formation of bridges and crosslinking of the filaments obstruct the expansion of the mat, and the effect of the expanding material does not fully come to bear.

SUMMARY OF THE INVENTION

The invention provides a bedding mat for the purpose specified above which is blowout-proof, and has high expansion capability that is improved versus the prior art mats specified above. Furthermore, conventional methods of textile processing are to be applicable for producing the mat according to the invention.

It is an object of the invention to provide a bedding mat for supporting an exhaust gas catalyst in a metallic catalyst housing that is used for purifying the exhaust gases of motor vehicles. This bedding mat is made from the following materials:

1. A yarn that is processed to a flat textile structure, the yarn consisting of voluminous, thermally stable filaments that are aligned in parallel and bundled to form the yarn, and a casing for the yarn that decomposes upon heating; and
2. an edge protection made of thermally stable threads extending along the edges of the flat structure.

DETAILED DESCRIPTION OF PREFERRED EMBODIMENTS

The material used to make the yarn preferably comprises textured yarns made of inorganic staple fibers or filaments, which are aligned in parallel and compacted to form yarns having a diameter of between 3 and 12 mm. A yarn with a diameter of about 6 mm is particularly preferred. Suitable thermally stable or heat-resistant materials primarily include textile glass fibers, basalt fibers, $SiO_2$-fibers, quartz fibers and aluminum silicate fibers. Voluminous yarns made of other inorganic or organic materials that are heat-stable up to at least 400° C. may also be used. The casing for the yarn usefully consists of sewing threads, which are guided around the bundle of fibers or filaments of the yarn, and may have the form, for example of a basket-weave. The casing for the yarn preferably consists of cotton or viscose threads. Other materials whose temperature resistance does not substantially exceed 200° C. may also be used.

The yarn as defined by the invention, from which the bedding mat is produced, has high ability to expand when the yarn is heated up to the operating temperature of the bedding mat. It is essential to the invention that the filaments bundled together in a yarn are aligned in parallel with each other, and are not twisted with each other. They are compacted by radial pressure or tension into a bundle with high packing density, and fixed by the encasement of the bundle. Fabrics, mats, knitted or similar flat structures can be produced from the yarn on conventional textile processing machines. The thermal stability of the yarn casing is lower than the operating temperature at which the bedding mat is used, and the casing is destroyed when it is heated the first time. Here, the deformation energy of the yarn filaments stored in the bundle is released. The released deformation energy causes a widening of the yarn from which the bedding mat is made, and the volume of the flat structure produced from the yarn increases accordingly.

The expanding effect of the yarn employed within the scope of the invention can be enhanced by adding an expanding material such as, for example vermiculite, mica and/or graphite. According to a preferred embodiment of the invention, the yarn contains a core made of expanding material that is surrounded by the yarn filaments, or the filaments forming the yarn have a coating of expanding material.

The bedding mat of the invention can be produced in the form of a mat, a fabric, or with a woven or knitted structure. The flat structure is usefully provided with many layers, and it is produced in custom sizes in terms of textile technology without cutting edges. The safety of the bedding mat against blow-out can be enhanced even more by omitting cutting edges. As edge protection, the edges of the flat structure preferably have seams produced with thermally stable threads. Suitable are threads that still exhibit adequate tensile strength at the operating temperature of the bedding mat. Threads made of textile glass, $SiO_2$, $Al_2O_3$, metal or the like can be used. To improve the edge protection further, it is possible to tie a fabric band made of thermally stable material to the edges, where such a strip of fabric is fixed with at least one thermally stable quilting thread. The materials specified above, for example, are suited as thermally stable materials.

According to a particularly preferred embodiment of the invention, the bedding mat consists of a mat, whereby the yarn is mechanically fixed in the flat structure with quilted seams. The quilted seams are produced with a sewing thread whose thermal stability is below the operating temperature of the bedding mat. When the bedding mats are heated, the sewing thread is destroyed, whereby the deformation energy resulting from the pre-compacting is released, and the expansion effect resulting from the increase in the volume of the yarn is intensified. The described effect is particularly high if the yarn is fixed by the quilted seams in the mat under tensile stress.

Accordingly, while a few embodiments of the present invention have been shown and described, it is to be understood that many changes and modifications may be made thereunto without departing from the spirit and scope of the invention as defined in the appended claims.

What is claimed is:

1. A bedding mat for supporting an exhaust gas catalyst in a metallic housing used to purify motor vehicle exhaust gases, comprising:
   (a) a yarn processed to form a flat textile structure, said yarn comprising a core of expanding material surrounded by a plurality or voluminous filaments thermally stable up to at least 400° C. and aligned parallel with each other, said filaments being coated with am expanding material and a casing around said filaments, said casing decomposing upon heating; and
   (b) an edge protection made of threads thermally stable up to at least 400° C. extending along the edges of said flat textile structure.

2. The bedding mat according to claim 1, wherein said filaments comprise textured inorganic staple fibers, said fibers being compacted to form a plurality of filaments aligned in parallel with a diameter of between 3 and 12 mm.

3. The bedding mat according to claim 2, wherein said filaments consist of fibers selected from the group consisting of textile glass fibers, basalt fibers, $SiO_2$ fibers, quartz fibers and aluminum silicate fibers.

4. The bedding mat according to claim 1, wherein said casing comprises sewing threads guided around said filaments.

5. The bedding mat according to claim 4, wherein said casing is basket-weaved.

6. The bedding mat according to claim 1, wherein said casing comprises cotton or viscose threads.

7. The bedding mat according to claim 1, wherein said expanding material is selected from the group consisting of vermiculite, mica and graphite.

8. The bedding mat according to claim 1, wherein said flat structure is selected from the group consisting of a mat, a woven structure and a knitted structure.

9. The bedding mat according to claim 1, wherein said flat structure is made in custom sizes.

10. The bedding mat according to claim 1, wherein the yarn is mechanically fixed in said flat structure with quilted seams, whereby said quilted seams are produced with a sewing thread whose thermal stability is below 200° C.

11. The bedding mat according to claim 10, wherein said yarn is fixed by the quilted seams under tensile stress.

12. The bedding mat according to claim 1, wherein the edges of said flat structure have seams as edge protection, said seams consisting of thermally stable threads selected from the group consisting of textile glass, $SiO_2$, $Al_2O_3$ and metal.

13. A method of producing a bedding mat for supporting an exhaust gas catalyst in a metallic housing used to purify motor vehicle exhaust gases, which comprises the steps of:
   (a) processing a yarn to form a fiat textile structure, said yarn comprising a core of expanding material surrounded by a plurality at voluminous filaments thermally stable up to at least 400° C. and aligned parallel with each other in a bundle, said filaments being coated with an expanding material, and a casing around said filaments, said casing decomposing upon heating; and
   (b) extending an edge protection made of threads thermally stable up to at least 400° C. along the edges of said flat textile structure.

14. The method according to claim 13, wherein the casing comprises a plurality of threads sewn around said filaments.

15. The method according to claim 13, wherein the casing is basket-weaved.

* * * * *